No. 730,309. Patented June 9, 1903.

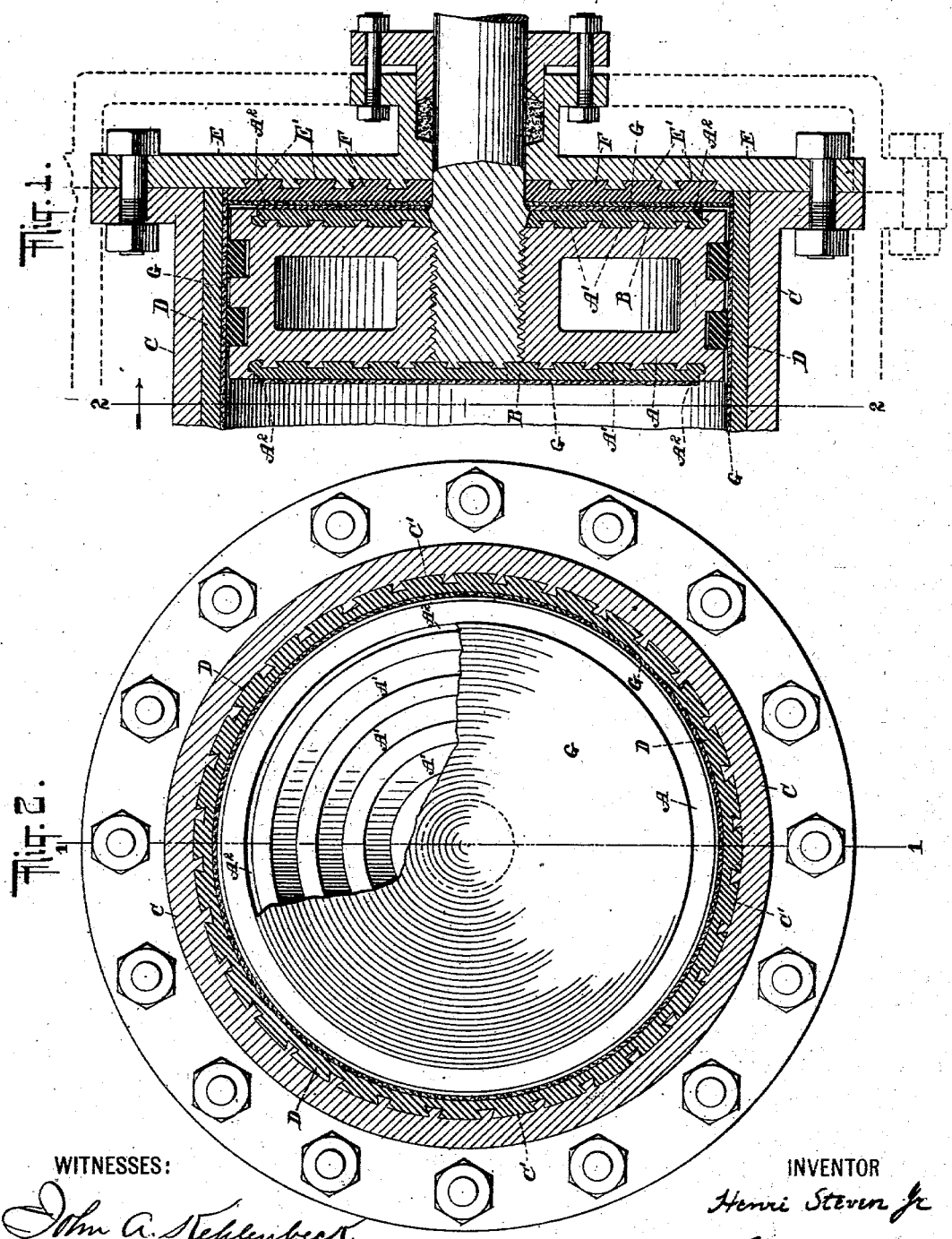

UNITED STATES PATENT OFFICE.

HENRI STEVEN, JR., OF CHARLEROI, BELGIUM.

STEAM-ENGINE.

SPECIFICATION forming part of Letters Patent No. 730,309, dated June 9, 1903.

Application filed February 1, 1902. Serial No. 92,184. (No model.)

*To all whom it may concern:*

Be it known that I, HENRI STEVEN, Jr., a subject of the King of Belgium, and a resident of Charleroi, Belgium, have invented certain new and useful Improvements in Steam-Engines, of which the following is a full, clear, and exact description.

My invention relates to steam-engines, or, more broadly speaking, to engines in which an active medium of relatively high temperature is employed, and has for its object to reduce as far as possible the loss of heat due to transmission by metallic bodies and to condensation. To this end I construct or line the surfaces with which the steam or other heated medium comes in contact in such a manner that the steam will impinge against bad conductors of heat—that is, in the case of an ordinary piston steam-engine I would line the piston and the cylinder and, if necessary, even the steam ports and channels with a bad conductor of heat of such a character that it will produce but little friction and will be capable of resisting the action of the steam.

An example of my invention is shown in the accompanying drawings, in which—

Figure 1 is a longitudinal section of a steam-engine cylinder and piston embodying my invention, and Fig. 2 is a cross-section thereof.

In carrying out my invention, as shown in the drawings, I provide the piston A with a series of concentric grooves A' of dovetail form, and I recess the end faces of the piston, as indicated at $A^2$. Into these grooves I press a lining B of soft rubber on both sides of the piston, the material owing to its inherent elasticity expanding to fill the grooves A'. The cylinder-walls C are also lined with soft rubber D, fitted into dovetail grooves C', extending lengthwise of the cylinder, and similarly the cylinder-heads E have soft-rubber linings F, fitting into grooves E'. These linings B D F after being applied to the metallic parts, as described, are vulcanized, according to the well-known procedure. In some cases it may be advisable to apply similar linings to the steam ports and channels.

In order to increase the resistance of the hard-rubber lining against the action of steam, I may coat this lining with a layer of plumbago, graphite, or other suitable material for the purpose of depositing thereon electrically any appropriate metal—as, for instance, copper—as indicated at G. Instead of this metallic facing I may employ a coating of a suitable varnish, such as linseed-oil, boiled mineral oil, or any composition capable of withstanding high temperatures. I thus protect the hard-rubber lining against direct contact with steam and destruction or injury thereby.

I desire it to be understood that I do not restrict myself to the particular construction shown for connecting the non-conducting linings with the metallic parts. Furthermore, I wish to state that instead of hard rubber I may employ other substances of similar heat conductivity.

My invention is of particular advantage in cases where superheated steam is used and will avoid in a large measure the great losses of heat which occur in engines of the customary type, owing to condensation and to transmission of heat.

As hereinbefore set forth, my invention is applicable to cylinders, pistons, and in a general way to all surfaces which would otherwise be exposed to the steam or other hot medium. In the appended claims I have referred to the "cylinder;" but I desire it to be understood that I include under this term as equivalents in my invention the piston, the steam-chest, and any other part of the engine which would be exposed to the steam, if unprotected, and I wish it to be distinctly understood that the claims cover such equivalent constructions.

I claim as my invention and desire to secure by Letters Patent of the United States—

1. An engine, the cylinder of which is lined upon that surface which would otherwise be exposed to the driving medium, with a bad conductor of heat, having an electrically-deposited metallic coating upon its face.

2. An engine, the cylinder of which is lined on that surface which would otherwise be exposed to the driving medium, with hard rubber having an electrically-deposited metallic coating on its face.

3. An engine, the cylinder of which is lined upon that surface which would otherwise be exposed to the driving medium, with a bad conductor of heat, provided with a protective metallic coating upon its face.

4. An engine, the cylinder of which is provided with grooves upon that surface which would otherwise be exposed to the driving medium, and a bad conductor of heat which lines said surface and is formed with ribs extending into said grooves.

In testimony whereof I have hereunto set my hand in the presence of two subscribing witnesses.

HENRI STEVEN, JR.

Witnesses:
C. DONIES,
J. DONIES.